3,054,769
STABILIZED SILICONE ELASTOMERS AND
PROCESS FOR THEIR PRODUCTION
Roscoe A. Pike, Grand Island, N.Y., assignor to Union
Carbide Corporation, a corporation of New York
No Drawing. Filed June 19, 1958, Ser. No. 742,978
23 Claims. (Cl. 260—37)

This invention relates to organosilicon compositions. More particularly, this invention relates to silicone elastomers that are protected against oxidation at elevated temperatures (i.e. stabilized) and to processes for the production of such elastomers.

Silicone elastomers are useful in many applications because of their desirable physical properties, such as their dielectric properties and thermal stability at moderate temperatures. However, silicone elastomers have been found to decompose when heated in air at elevated temperatures for prolonged periods of time, apparently due to an oxidation reaction. The temperature at which a silicone elastomer decomposes is dependent upon the organic substituents present in the gum from which it is produced. By way of illustration, a silicone elastomer produced from a gum composed of diethylsiloxy groups was found to decompose when heated at 150° C. for 6 hours, whereas a silicone elastomer produced from a gum composed of predominately dimethylsiloxy groups and small amounts of ethylvinylsiloxy groups was found to decompose when heated at 250° C. for 24 hours. The decomposition of silicone elastomers at elevated temperatures was found to result in the loss of desirable properties, such as a decrease in tensile strength.

Silicone elastomers are produced by curing organopolysiloxane gums, usually employing organic peroxides (most often benzoyl peroxide) as curing agents and carbonaceous or inorganic materials as fillers. It has been proposed that the decomposition of silicone elastomers at elevated temperatures might be avoided by incorporating an organic antioxidant in an organopolysiloxane gum and then curing the gum using benzoyl peroxide as a curing agent. This proposal was not found satisfactory since organic antioxidants were found to react with the benzoyl peroxide used to cure the organopolysiloxane gum. Neither the antioxidant nor the benzoyl peroxide was then able to perform its intended function.

Another process that has been suggested to stabilize silicone elastomers involves applying a solution of an organic antioxidant dissolved in an organic solvent to an elastomer, allowing the solution to penetrate into the elastomer and then removing the solvent to produce an elastomer containing the antioxidant. This process was not found to be particularly useful since such solutions do not readily penetrate into the interior of silicone elastomers and so the antioxidant is not uniformly dispersed throughout the elastomer. Such solutions cause swelling of the silicone elastomers. In addition, it is difficult to precisely control the amount of the antioxidant incorporated in the elastomer by this process and it is difficult to entirely remove the solvent from the elastomer.

It has recently been found that certain combinations of organic antioxidants and peroxide curing agents may be used in processes for the production of stabilized silicone elastomers provided that the antioxidant and curing agent are employed in certain relative amounts. The latter process involves forming a curable gum compound containing an organic antioxidant, a peroxide curing agent in an amount greater than the amount of the antioxidant and an organopolysiloxane gum and heating the curable gum compound to a temperature sufficiently elevated to cure the gum compound to produce a stabilized silicone elastomer. One such process employs a combination of an aryl amine antioxidant and a dialkyl peroxide curing agent. The other process employs a combination of a hydroxy substituted aromatic compound as an antioxidant and a diacyl peroxide curing agent. These combinations of antioxidants and curing agents were found not to undergo undesirable reactions. Although these processes are useful, they were found to have certain disadvantages. By way of illustration, both of these processes are somewhat inflexible since they require certain combinations of organic antioxidants and peroxide curing agents. As a further illustration, the process wherein a dialkyl peroxide curing agent is employed is useful only with organopolysiloxane gums that cure by the reaction of silicon-bonded monovalent olefinicially unsaturated hydrocarbon groups.

This invention is based, in part, on the discovery that when antioxidants retained by zeolitic molecular sieves are mixed with organopolysiloxane gums to produce curable gum compounds, the antioxidants are not lost by volatilization when the gum compound is stored or cured and, furthermore, such retained antioxidants do not react with peroxide curing agents that may be added to the curable gum compound to effect curing. After curing, that is after the peroxide has effected curing and decomposed, the antioxidant can be released by heating the elastomer to a temperature above that normally used for curing and sufficiently elevated to release the antioxidant from the zeolitic molecular sieve.

This invention provides for the production of stabilized silicone elastomers by a process which involves forming a curable mixture containing an organopolysiloxane gum and a zeolitic molecular sieve retaining an aromatic antioxidant and curing the curable gum compound, preferably by incorporating an organic peroxide curing agent in the curable gum compound and then heating the curable gum compound to a temperature sufficiently elevated to cure the gum compound to produce an elastomer. The stabilized silicone elastomers so produced contain a zeolitic molecular sieve retaining an antioxidant.

The zeolitic molecular sieves that are useful in this invention are metal-alumino-silicates that are crystalline in structure. The crystalline structure of these zeolitic molecular sieves is such that the crystals contain interstitial spaces or cavities, access to which is had by way of openings or pores in the surface of the crystal. Foreign molecules whose size permits them to pass through the pores and into the cavities of the zeolitic molecular sieve are strongly retained by a sorption phenomenon within the cavity. The retention of foreign molecules (adsorbates) by zeolitic molecular sieves is also determined by such factors as the polarizability and polarity of the adsorbate, the degree of unsaturation of the adsorbate, the size and polarizing power of the metal in the zeolitic molecular sieve, the presence of other adsorbates in the cavities of the sieve and the degree of dehydration of the sieve.

Both naturally occurring and synthetic zeolitic molecular sieves are useful in this invention. Illustrative of the synthetic zeolitic molecular sieves that are useful in this invention is the zeolitic molecular sieve that is known as Zeolite L and that may be represented by the average formula:

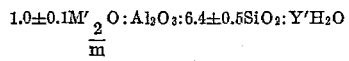

wherein M' is an exchangeable cation, m is the valence of M' and Y has a value from 0 to about 7. The exchangeable cations that may be present in Zeolite L include monovalent, divalent and trivalent metal ions, particularly those of groups I, II and III of the periodic table, as set forth in Webster's New Collegiate Dictionary, 1956 edition, page 626. Among such cations are barium, calcium, cerium, lithium, magnesium, potassium, sodium, strontium, zinc ions, and the like. Preferably, the exchangeable cation is potassium. Zeolite L and a process for its production are disclosed in U.S. patent application Serial No. 711,565, filed January 28, 1958, now abandoned.

A second illustration of the synthetic zeolitic molecular sieves that are useful in this invention is the zeolitic molecular sieve that is known as Zeolite X and that may be represented by the average formula:

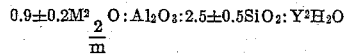

wherein $M^2$ is a cation having a valence of not more than three (such as calcium, strontium, barium, sodium, potassium and lithium, but preferably sodium), m is the valence of cation $M^2$, and $Y^2$ has a value from 0 to about 8. Zeolite X and a process for its production are disclosed in U.S. patent application Serial No. 400,389, filed December 24, 1953, now Patent No. 2,882,244. A form of Zeolite X that has been found particularly useful in this invention is the sodium form of Zeolite X that is known as Zeolite Sodium X (hereinafter referred to as Zeolite NaX) and that may be represented by the average formula:

$$0.9 \pm 0.2 Na_2O : Al_2O_3 : 2.5 \pm 0.5 SiO_2 : Y^2H_2O$$

wherein $Y^2$ has the above defined meaning.

Another third illustration of the synthetic zeolitic molecular sieves that are useful in this invention is the zeolitic molecular sieve that is known as Zeolite Y and that may be represented by the average formula:

$$0.9 \pm 0.2 Na_2O : Al_2O_3 : GSiO_2 : Y^3H_2O$$

wherein G has a value from greater than 3 and up to about 5, and $Y^3$ has a value from 0 to about 9. Zeolite Y and processes for its production are disclosed in U.S. patent application Serial No. 728,057, filed April 14, 1958, now abandoned.

Illustrative of the naturally occurring zeolitic molecular sieves that are useful in this invention is the zeolitic molecular sieve that is known as faujasite and that may be represented by the average formula:

wherein $M^3$ is calcium and sodium, p is the valence of $M^3$ and $Y^4$ has a value from 0 to about 8.

The zeolitic molecular sieves that are used in this invention are activated prior to use by heating the sieve. Apparently, heating the sieves effects a release of water molecules that is contained in the cavities of the sieve. The heating and the resulting loss of water does not destroy the crystalline structure of the sieve. The activation may be conducted, in the usual case, by heating the sieve at a temperature from about 250° C. to about 600° C.

It was found that the molecular dimensions of the antioxidants that are useful in this invention are such that the antioxidant can pass through the pores and enter the cavities of Zeolites L, X, Y and faujasite. In this connection it has been found that the zeolitic molecular sieves useful in the practice of this invention are those which have pores capable of accepting aromatic compounds such as benzene. Synthetic Zeolite L, synthetic Zeolite X, synthetic Zeolite Y and naturally-occurring faujasite are among the zeolitic molecular sieves able to accept and retain aromatic compounds such as benzene.

The zeolitic molecular sieves whose pores are too small to admit the antioxidants that are employed in this invention are not particularly useful in the present invention. Such zeolitic molecular sieves usually exhibit a relatively lower order of retentive power for the antioxidants used in this invention that is comparable to the relatively low retentive power of silica gel and carbon black for these antioxidants. The retentive power of silica gel and carbon black for adsorbates is largely due to adsorption of the adsorbate on the outer surface of these materials.

Apparently the failure of the antioxidants used in this invention to react with peroxide curing agents during the curing of organopolysiloxane gums is due to the strong adsorption of the antioxidants within the cavities of the zeolitic molecular sieves. The peroxide curing agents decompose during curing. Subsequently, when the elastomers are heated for prolonged periods of time at elevated temperatures (that are encountered in various applications where silicone elastomers are employed and that are above the temperature usually employed in curing gum compounds to produce silicone elastomers), the antioxidants are released by the zeolitic molecular sieves. The antioxidants then exert their stabilizing influence on the elastomers, i.e. the antioxidants inhibit the decomposition of the elastomers.

By suitably selecting zeolitic molecular sieve-organic antioxidant combinations for use in this invention, the temperature at which the organic antioxidant is released can be controlled. Proper selection is desirable when high cure temperatures are used.

The antioxidants that are useful in this invention are aromatic compounds that contain at least one substituent group that causes the compound to be susceptible to oxidation, such as an amino, a hydroxyl or an alkoxy group. Apparently the stabilizing effect of these antioxidants is due, in part, to the preferential oxidation of the antioxidant and the presence of a group such as an amino, hydroxyl or alkoxy group secures this result by decreasing the resistance of the aromatic compound to oxidation. Illustrative of antioxidants that are useful in this invention are such substituted aromatic compounds as primary, secondary and tertiary aryl amines (for example diphenyl amine, N-phenyl-alpha-naphthylamine, N-phenyl-beta-naphthylamine and N,N'-bis-dinaphthyl-para-phenylene diamine); hydroxyl-substituted aromatic compounds including alkyl-substituted monohydric phenols (for example 2,6-di(tert-butyl)4-methyl phenol and 6 tert-butyl meta-cresol), aryloxy-substituted phenols (for example 2-(tert-butyl)-4-phenoxy phenol), trihydric phenols (for example pyrogallol), dihydric phenols (for example 4-tert-butyl catechol, 4-phenyl catechol, 2,5-di(tert-butyl)hydroquinone, 3-methyl catechol and cyclohexyl catechol), di-(hydroxyphenyl) alkanes (for example bis(2-hydroxy-3-tert butyl-5-methyl phenyl) methane), dihydric naphthols (for example 1,5-dihydroxynaphthylene), hydroxyl-substituted aryl amines (for example ortho-aminophenol, N-butyl-para-aminophenol) and aralkoxy-substituted phenols (for example hydroquinone monobenzyl ether); and dialkoxy-substituted aromatic compounds (for example hydroquinone dimethyl ether). The preferred antioxidants are alkyl-substituted monohydric phenols, such as 2,6-di(tert-butyl)4-methyl phenol and secondary aryl amines, such as N-phenyl-alpha-naphthylamine, N-phenyl-beta-naphthylamine and N,N'-bis-dinaphthyl-para-phenylene diamine. In general, it was found that organic antioxidants containing amino groups, especially secondary amine groups, were more effective in stabilizing silicone elastomers than organic antioxidants containing only hydroxyl groups as substituents.

Apparently the stabilizing effect at elevated temperatures of the antioxidants used in this invention is due, at least in part, to the presence of an aryl group in the molecules of these antioxidants. Aliphatic compounds having the functional groups present in the antioxidants used in this invention were not found useful in stabilizing silicone elastomers at elevated temperatures. By way of illustration, triethanolamine was found to be ineffective in stabilizing silicone elastomers at elevated temperatures.

The amount of antioxidant used in this invention is not narrowly critical and may vary widely depending on the thermal sensitivity of the elastomer and the temperature to which the elastomer will be exposed. In practice it was found that amounts of antioxidants of from 0.1 part by weight to 3.0 parts by weight per 100 parts by weight of the organopolysiloxane gum are generally useful; but, amounts of the antioxidants of from 0.5 part by weight to 1.0 part by weight per 100 parts by weight of the organopolysiloxane gum are preferred. The use of larger amounts of the antioxidant might in turn entail use of such large amounts of a zeolitic molecular sieve that the physical properties of the elastomer might be impaired. The use of smaller amounts of the antioxidant might result in the production of an elastomer containing too little antioxidant to effectively stabilize the elastomer, particularly at very high temperatures. However, other than the indicated amounts of antioxidant might be employed without any commensurate advantage being gained by so doing.

The particular antioxidant employed in this invention is generally not determined by the type of curing agent, for example the type of peroxide, used to cure the organopolysiloxane gum. Similarly, the amount of the antioxidant used is not limited by the amount of peroxide curing agent that may be used.

The antioxidants used in this invention may be caused to be retained by zeolitic molecular sieves by various processes. By way of illustration, antioxidant may be vaporized and allowed to condense in the presence of the zeolitic molecular sieve. Alternately the antioxidant might be caused to sublime and condense in the presence of the zeolitic molecular sieve. Preferably the retention of the antioxidant by the zeolitic molecular sieve is brought about by a process that includes forming a mixture of the antioxidant, the zeolitic molecular sieve and a liquid organic compound in which the antioxidant is soluble and heating the mixture so formed to produce a zeolitic molecular sieve retaining the antioxidant.

In this preferred process for causing the antioxidant to be retained by the zeolitic molecular sieve, such hydrocarbon solvents as n-heptane, cyclohexane, and the like may be employed as the liquid organic compound in which the antioxidant is soluble. The use of n-heptane is preferred. The amounts of the liquid organic compound used is not narrowly critical and may vary from 10 parts by weight to 1000 parts by weight of the liquid organic compound per part by weight of the antioxidant; but it is preferred to employ from 75 parts by weight to 400 parts by weight of the liquid organic compound per part by weight of the antioxidant. Other amounts of the liquid organic compound may be used without any corresponding desirable effect being produced.

The temperatures used in causing the antioxidant to be retained by the zeolitic molecular sieve in the preferred process can vary widely but are generally within the range of from 25° C. to 200° C. and more desirably within the range of from 60° C. to 130° C. For convenience, the temperature used may be the temperature at which the liquid organic compound boils in the presence of the antioxidant and the zeolitic molecular sieve so that the liquid organic compound may be refluxed.

The amount of antioxidant retained by the zeolitic molecular sieve is not fixed by sharply defined limits, and may vary widely depending on such factors as the size of the cavities in the zeolitic molecular sieve, the dimensions of the molecules of the antioxidant, whether or not the maximum amount of antioxidant is retained by the zeolitic molecular sieve and the presence of other absorbates retained by the zeolitic molecular sieve. In practice it was found that amounts of the antioxidant from 1 part to 25 parts by weight per 100 parts by weight of the zeolitic molecular sieve are useful but amounts of the antioxidant from 10 parts by weight to 20 parts by weight per 100 parts by weight of the zeolitic molecular sieve are preferred. Greater amounts of the antioxidant increases the tendency of crystals of the antioxidant to be deposited on the outer surface of the zeolitic molecular sieve. Such crystals react readily with peroxides that may be used as curing agents. Lesser amounts of the antioxidant would be so strongly retained that they would not be particularly useful at lower temperatures.

The starting organopolysiloxane gums used in this invention include both homopolymeric and copolymeric siloxanes. These siloxanes contain siloxane groups represented by the formula:

wherein R is a monovalent hydrocarbon group that is free of olefinic unsaturation and R' is a monovalent olefinically unsaturated hydrocarbon group or a monovalent hydrocarbon group that is free of olefinic unsaturation. The ratio of the organic groups (i.e. monovalent hydrocarbon groups that are free of olefinic unsaturation and monovalent olefinically unsaturated hydrocarbon groups) to silicon atoms in the starting organopolysiloxane gum is from 1.95 to 2.05.

Illustrative of the monovalent olefinically unsaturated hydrocarbon groups that are represented by R' in Formula 1 are the alkenyl groups (for example the vinyl and the allyl group) and the cycloalkenyl groups (for example the cyclohexenyl group). The preferred monovalent olefinically unsaturated hydrocarbon group is the vinyl group.

Illustrative of the monovalent hydrocarbon groups that are free of olefinic unsaturation and that are represented by R and R' in Formula 1 are the alkyl groups (for example the methyl, ethyl and propyl groups); the aryl groups (for example the phenyl group); the aralkyl groups (for example the benzyl and the phenylethyl group); and the cycloalkyl groups (for example the cyclohexyl group).

Useful organopolysiloxane gums may contain siloxane groups that are represented by Formula 1 wherein either the same hydrocarbon groups are attached to the silicon atoms (e.g. the dimethylsiloxy, diphenylsiloxy and diethylsiloxy groups) or different hydrocarbon groups are attached to the silicon atoms (e.g. the methylphenylsiloxy, phenylethylmethylsiloxy, ethylphenylsiloxy, methylvinylsiloxy and phenylvinylsiloxy groups).

Useful starting organopolsiloxane gums contain one or more types of siloxane groups represented by Formula 1. By way of illustration, one useful gum is composed of only dimethylsiloxy groups; a second useful gum is composed of methylvinylsiloxy groups and dimethylsiloxy groups; and a third useful gum is composed of methylvinylsiloxy groups, dimethylsiloxy groups and diphenylsiloxy groups.

The invention is particularly applicable to the production of stabilized silicone elastomers from organopolysiloxane gums containing hydrocarbon groups that render the resulting elastomer susceptible to decomposition at elevated temperatures. By way of illustration, satisfactory silicone elastomers can be produced by the process of this invention from gums containing silicon-bonded ethyl groups and/or vinyl groups.

The curing of a starting organopolysiloxane gum involves the production of crosslinks between the molecules of the gum. Silicon-bonded monovalent olefinically unsaturated hydrocarbon groups [i.e. groups represented by R' in Formula 1] react to produce such crosslinks between the molecules of the organopolysiloxane gum. The relative amount of the siloxane groups represented by Formula 1 wherein R' is a monovalent olefinically unsaturated hydrocarbon group contained in the gum is that amount which provides the degree of crosslinking necessary to impart elastomeric properties to the cured product. The cured products produced from gums that are crosslinked by an insufficient amount of groups represented by Formula 1 wherein R' is a monovalent olefinically unsaturated hydrocarbon group are soft and gummy rather than elastomeric. The cured products produced from gums that are crosslinked by an excessive amount of groups represented by Formula 1 wherein R' is a monovalent olefinically unsaturated hydrocarbon group are hard and brittle rather than elastomeric. Generally, amounts of such siloxane groups from 0.05 part to 3.0 parts by weight per 100 parts by weight of the siloxane groups in the gum usually provide the degree of crosslinking necessary to produce an elastomeric product. Preferably, the starting gum contains from 0.2 part to 0.4 part by weight of such siloxane groups per 100 parts by weight of the siloxane groups in the gum. Conversely, in this instance, the gum may contain from 97.0 parts to 99.95 parts by weight but preferably contains from 99.6 parts to 99.8 parts by weight of siloxane groups represented by Formula 1 wherein R' is a monovalent hydrocarbon group that is free of olefinic unsaturation.

The presence of silicon-bonded monovalent olefinically unsaturated hydrocarbon groups in the starting gum is not essential since other silicon-bonded groups (e.g. silicon-bonded alkyl groups) can react to produce crosslinks between the molecules of the starting gum.

Starting organopolysiloxane gums that are useful in this invention may be produced from chlorosilanes or alkoxy silanes by known hydrolysis, condensation and equilibration processes. Useful starting organopolysiloxane gums and processes for their production are described in U.S. patent application Serial Number 470,834, filed November 23, 1954. Due to the monoorganosilane impurities (e.g. methyltrichlorosilane) and triorganosilane impurities (e.g. trimethylchlorosilane) in the starting materials, such organopolysiloxane gums usually contain small amounts of monoorganosiloxy groups (e.g. monomethylsiloxy groups) and triorganosiloxy groups, (e.g. trimethylsiloxy groups). Small amounts of the latter mentioned groups may be present by design as end-blocking or chain terminating groups.

Useful starting organopolysiloxane gums may contain small amounts of organic end-blocking or chain terminating groups. By way of illustration, useful gums may contain small amounts of alkoxy end-blocking groups.

In producing the stabilized silicone elastomers of this invention, a curable gum compound is formed containing an organopolysiloxane gum and a zeolitic molecular sieve retaining an organic antioxidant. As used herein the phrase, "curable gum compound" denotes a mixture that can be cured to produce a silicone elastomer. These gum compounds may be formed in known apparatus such as two-roll rubber mills and the like and they may be stored for prolonged periods without change in composition, e.g. by sublimation of the antioxidant.

In the practice of this invention a uniform dispersion of the antioxidant throughout the organopolysiloxane gum and, consequently, the production of a silicone elastomer containing a uniformly dispersed antioxidant is readily achieved since the gum is in a plastic and easily workable state. The amounts of the antioxidant incorporated in the gum is readily controlled and no solvent is required to introduce the antioxidant into the elastomer. These desirable features are not obtainable by known processes for incorporating organic antioxidants in silicone elastomers i.e. applying a solution containing an organic antioxidant and an organic solvent to a cured elastomer.

The amounts of the zeolitic molecular sieve mixed with the organopolysiloxane in producing the stablized silicone elastomers of this invention is not narrowly critical and may very widely depending largely on the amount of the zeolitic molecular sieve required to provide the amount of antioxidant needed to stabilize the elastomer. In practice it was found that from 0.1 part to 4 parts by weight of the zeolitic molecular sieve per 100 parts by weight of the organopolysiloxane gum are useful but from 0.5 part to 1.5 parts by weight of the zeolitic molecular sieve per 100 parts by weight of the organopolysiloxane gum is preferred. Other than the indicated amounts of the zeolitic molecular sieve may be used but no commensurate advantage is gained thereby.

The curable gum compounds used in this invention usually contain a filler. The fillers that are useful in this invention include acidic fillers (such as uncoated finely divided silica), basic fillers (such as carbon black and alumina) and neutral fillers (such as diatomaceous earth, coated finely divided silica, calcium carbonate and quartz). These fillers impart desirable physical properties (e.g. high tensile strength) to silicone elastomers.

The effectiveness of some of the peroxide curing agents that may be used in this invention is impaired by certain fillers. By way of illustration, the effectiveness of benzoyl peroxide curing agents is impaired by carbonaceous fillers (such as carbon black) and so such fillers are not employed when benzoyl peroxide is used as a curing agent. As a further illustration, the effectiveness of dicumyl peroxide as a curing agent is impaired when it is used in curable gum compounds containing silica (or other acidic fillers) as the sole filler. Hence, when dicumyl peroxide is employed as a curing agent neutral fillers, basic fillers or mixtures of acidic fillers and neutral or basic fillers are used.

The amount of the filler that may be used in this invention is not narrowly critical and may range from 25 parts to 65 parts by weight of the filler per 100 parts by weight of the organopolysiloxane gum. Preferably from 35 parts to 45 parts by weight of the filler per 100 parts by weight of the gum are employed.

The coated finely divided silicas that may be blended with the curable mixtures used in this invention include those coated silicas that contain alkoxy groups attached to the silicon atoms on the surface of the silica. It has been found that such coated silica, although usually susceptible to decomposition at high temperatures, are stabilized by the antioxidants used in this invention.

It is often advantageous to preblend the filler and the organopolysiloxane gum and allow the mixture to bin age. This procedure promotes wetting of the filler by the gum. Then the zeolitic molecular sieve retaining an antioxidant may be mixed with the preblended filler and gum to produce a curable gum compound.

Curable gum compounds of this invention containing no filler may be applied to fibrous materials and cured thereon to produce an elastomer. In such cases the elastomer has physical properties comparable to an elastomer produced from a curable gum compound containing a filler. Apparently the fibrous material functions as a filler.

In producing the stabilized silicone elastomers of this invention, curable gum compounds containing organopolysiloxane gums and zeolitic molecular sieves retaining organic antioxidants may be cured by various processes. Suitable processes include those that employ ozone, azo compounds, electronic beams, heat alone, sulfur and heat in conjunction with an organic peroxide curing agent. The curing process that is preferred in producing the stabilized silicone elastomer of this invention includes mixing an organic peroxide curing agent along with a curable gum compound containing organopolysiloxane gum and a zeolitic molecular sieve retaining an organic antioxidant to produce a mixture that is cured by heating.

Organic peroxides are useful in this invention as curing agents. Included among such organic peroxides are alkyl peroxides, acyl peroxides, and alkyl-acyl peroxides. Useful alkyl peroxide curing agents are the dialkyl peroxides (such as di(tert-butyl) peroxide and dicumyl peroxide) and the alkyl hydroperoxides (such as tert-butyl hydroperoxide and cumene hydroperoxide). Useful acyl peroxide curing agents are the diacyl peroxides (such as benzoyl peroxide, p-chlorobenzoyl peroxide and 2,4-dichlorobenzoyl peroxide) and per acids or peroxy acids (such as peracetic acid and perbenzoic acid). Useful alkyl-acyl peroxide curing agents may be illustrated by such compounds as tert-butyl perbenzoate and tert-butyl peracetate.

The type of organic substituent that is involved in the reaction that produces crosslinking during the cure of the starting gum determines to some extent which of the above-mentioned organic peroxide curing agents is most advantageously employed. Thus di(tert-butyl) peroxide is the preferred curing agent when the starting gum is cured by the reaction of silicon-bonded vinyl groups. Benzoyl peroxide is the preferred curing agent when the starting gum is cured by the reaction of silicon-bonded alkyl groups.

The amount of the organic peroxide used as a curing agent in this invention is not narrowly critical. In practice the amount of the curing agent may vary from 0.1 part by weight to 4 parts by weight of the peroxide per 100 parts by weight of the organopolysiloxane gum. When organopolysiloxane gums that cure through alkenyl groups are employed, the preferred amount of the peroxide curing agent is from 0.5 part to 1.0 part by weight per 100 parts by weight of the gum. When organopolysiloxane gums that cure through other groups are employed, the preferred amount of the peroxide curing agent is from 1.5 parts to 2.5 parts by weight per 100 parts by weight of the gum. Greater or lesser amounts of the peroxides may be used but no commensurate advantage is gained thereby. The type and amount of the organic peroxide curing agent used in this invention is not limited by the type or amount of antioxidant that is retained by the zeolitic molecular sieve.

In a preferred embodiment of this invention, a curable gum compound containing an organopolysiloxane gum, a zeolitic molecular sieve retaining an antioxidant and a peroxide is cured by the application of heat. The gum compound may be heated by various known means, such as on a slab mold. The gum compound may be cured by heating to a temperature of from 110° C. to 200° C. The preferred curing temperature, when organopolysiloxane gums that cure through olefinically unsaturated hydrocarbon groups are used, is from 170° C. to 180° C. The preferred cure temperature for other gums is usually from 120° C. to 130° C. The gum compound may be maintained at the curing temperature for from 5 minutes to 30 minutes but preferably for from 15 minutes to 20 minutes. Heating the mixtures to other temperature for other periods of time may accomplish the cure of the gum compound, since the particular temperature and time used is not narrowly critical, but no particular advantage is gained by departing from the indicated temperature and time ranges.

It was found that the retained antioxidants were not lost (e.g. by sublimation or volatilization) during the curing of the curable gum compounds of this invention.

The stabilized silicone elastomers of this invention are useful in the various application where known silicone elastomers are used and are particularly useful in high temperature applications where known silicone elastomers would decompose and lose their desirable properties. By way of illustration, the stabilized silicone elastomers of this invention are uniquely suited for service in high temperature environments such as may be encountered by oven seals, wire coatings in electrical insulators, steam heated rolls for paper mills, glass to metal sealants for arc lamps and hoses for jet engines. The stabilized silicone elastomer of this invention produced from a gum containing 0.35 part by weight of dimethylsiloxy groups per 100 parts by weight of the siloxane groups in the gum may be used at temperature of from 250° C. to 350° C. without appreciable loss of their physical properties.

Known heat aging tests may be used to determine the stability of the stabilized silicone elastomer of this invention. By way of illustration, the latter mentioned gum may be heat aged by maintaining the elastomer at a temperature of from 250° C. to 315° C. for from 24 hours to 96 hours. The retention of satisfactory physical properties (such as tensile strength, elongation, set at break, hardness) by the heat aged elastomer indicates its stability. Stabilized silicone elastomers of this invention, when heat aged in this manner, were found to retain satisfactory physical properties.

The following examples illustrate this invention.

EXAMPLE I

A mixture was formed in a 2-liter, three-necked flask. The mixture contained 20 g. of N-phenyl-beta-naphthylamine, 500 cc. n-heptane and 100 g. of Zeolite NaX powder. The mixture was heated to 96° C. which caused the n-heptane to reflux. The mixture was maintained at 96° C. for 3 hours. During this heating the color of the solvent phase in the mixture changed from brown to colorless. The mixture was then cooled and filtered. The solid so obtained was heated in a vacuum oven at 100° C. for 17 hours under a vacuum of 2.0 mm. Hg to remove n-heptane. There was obtained 118 g. of Zeolite NaX retaining N-phenyl-beta-naphthylamine. It was in the form of a brown powder.

The brown powder was found to be isotropic, light red by transmitted light and dark red by reflected light. The brown color of the powder could not be removed by washing the powder with xylene. The dark color could be removed by heat, but no change was observed until the powder had been heated from 350° C. to 400° C. At those temperatures the powder becomes lighter and eventually becomes white but no liquid phase separates from the powder.

N-phenyl-beta-naphthylamine is birefringent, soluble in water and inorganic solvents and has a melting point of 101–108° C. It can be recrystallized from its melt. Crystals of N-phenyl-beta-naphthylamine are colorless by transmitted light and white by reflected light.

EXAMPLE II

A mixture was formed in a 2-liter, three-necked flask that was equipped with mechanical stirrer and a reflux condenser. The mixture contained 20 g. of N,N'-bis-dinaphthyl-para-phenylene diamine, 100 g. of Zeolite NaX and 900 cc. n-heptane. The mixture was heated to 96° C. at which temperature the n-heptane refluxed and the mixture was maintained at this temperature for 7 hours. The mixture was then cooled to 60° C. and filtered. The solid so obtained was heated in a vacuum oven at 100° C. for 17 hours at a pressure of 2.0 mm. Hg to remove n-heptane. A dark blue-black powder (120 g.) was obtained.

The powder appeared to contain crystalline N,N'-bis-dinaphthyl-para-phenylene diamine on its surface since there were birefringent crystals on its surface. These crystals were removed by washing the powder with nitrobenzene. The color of the powder so obtained did not change when washed by nitrobenzene nor by heating to a temperature of 450° C. However, at 450° C. it was observed that something sublimed and decomposed with the concurrent change of the color of the powder from dark blue-black to white. Zeolite NaX is white.

N,N'-bis-dinaphthyl-para-phenylene is birefringent, melts below 300° C. and is soluble in nitrobenzene.

EXAMPLE III

A mixture was formed in a 2-liter, three-necked flask that was equipped with a mechanical stirrer and a reflux condenser. The mixture contained 100 g. of Zeolite NaX, 20 g. of 2,6-di-tert-butyl-4-methyl phenol, and 600 cc. of n-heptane. The mixture was stirred and heated to 96° C. at which temperature the n-heptane refluxed. The mixture was maintained at 96° C. for 6 hours. The color of the zeolite changed from white to pink to tan during that period. The mixture was then cooled to about 60° C. and filtered. The tan solid so obtained was heated in a vacuum oven at 100° C. for 17 hours at a pressure of 2.0 mm. Hg to remove n-heptane. There was obtained 113.5 g. of a light tan powder. Evaporation of the filtrate yielded 6.5 g. of crystalline 2,6-di-tert-butyl-4-methyl phenol. 13.5 g. of 2,6-di-tert-butyl-4-methyl phenol had been retained by the Zeolite NaX. The light tan powder was not changed when washed with solvents or when heated above the melting point of 2,6-di-tert-butyl-4-methyl phenol.

Pure 2,6-di-tert-butyl-4-methyl phenol is birefringent, non-subliming, low melting and soluble in carbon tetrachloride and benzene.

The dimethylpolysiloxane gums used in the following examples contained 0.35 part by weight of ethylvinylsiloxy groups and 99.65 parts by weight of dimethylsiloxy groups per 100 parts by weight of the siloxane groups in the gums.

The data obtained in Examples IV to VII are tabulated on Table I.

EXAMPLE IV

A curable gum compound was formed on a two-roll, 6-in. rubber mill. The gum compound contained the following components: 100 parts by weight (200 g.) of dimethylpolysiloxane gum, 40 parts by weight (80 g.) of finely divided silica ("Santocel CS"), 0.8 parts by weight (0.96 g.) of di(tert-butyl) peroxide, 1.5 parts by weight (3.0 g.) Zeolite NaX and 0.25 parts by weight (0.5 g.) N-phenyl-beta-naphthylamine. The gum and the finely divided silica have been preblended and aged for 4 months. The Zeolite NaX and N-phenyl-beta-naphthylamine used in the mixture were in the form of a brown powder that has been produced as described in Example I. The N-phenyl-beta-naphthylamine was retained by the Zeolite NaX. The gum compound so formed was cured by heating at 174° C. for 20 minutes in a conventional slab mold. A cured elastomer was produced thereby. One portion of this elastomer was heat aged by heating it at a temperature of 315° C. for 24 hours. Another portion of the elastomer was heat aged by heating at 315° C. for 96 hours in a forced-draft oven. See Table I, reference A, B and C.

Employing the same procedure, another elastomer was prepared from a curable gum compound containing 2.0 parts by weight N-phenyl-beta-naphthylamine. The other components of the mixture were the same as above (see Table I, references D, E and F).

EXAMPLE V

On a two-roll, 6-in. rubber mill a curable gum compound was formed. The gum compound contained the following components: 100 parts by weight (200 g.) dimethylpolysiloxane gum, 40 parts by weight (80 g.) finely divided silica ("Santocel CS"), 0.8 parts by weight (0.96 g.) di(tert-butyl) peroxide, 1.25 parts by weight (2.5 g.) Zeolite NaX and 0.25 parts by weight (0.5 g.) N,N'-bis-dinaphthyl-para-phenylene diamine. The gum and the finely divided silica had been pre-blended and aged for 4 months. The Zeolite NaX and the N,N'-bis-dinaphthyl-para-phenylene diamine used in the mixture were in the form of a dark blue-black powder that had been produced as described in Example II. The N,N'-bis-dinaphthyl-para-phenylene diamine was retained by the Zeolite NaX. The gum compound so formed was cured by heating the mixture at 174° C. for 20 minutes in a conventional slab mold to produce an elastomer. One part of the elastomer so produced was heat aged by heating the product at 315° C. for 24 hours in a forced-draft oven. Another part of the elastomer was heat aged by heating at 315° C. for 96 hours (see Table I, references G, H and I).

Employing the same procedure, another elastomer was prepared from a curable gum compound containing 2.0 parts by weight of N,N-bis-dinaphthyl-para-phenylene diamine. The other components of the gum compound were the same as above (see Table I, references J, K and L).

EXAMPLE VI

A curable gum compound was formed on a two-roll, 6-in. rubber mill. The gum compound contained the following components: 100 parts by weight (200 g.) dimethylpolysiloxane gum, 40 parts by weight (80 g) finely divided silica ("Santocel CS"), 0.8 part by weight (0.96 g.) a mixture (containing 50 parts by weight of benzoyl peroxide and 50 parts by weight of dimethylpolysiloxane oil per 100 parts by weight of the mixture), 2.1 parts by weight (4.1 g.) Zeolite NaX and 0.25 part by weight (0.5 g.) 2,6-di(tert-butyl)4-methyl phenol. The gum and the finely divided silica had been preblended and aged for 6 months. The Zeolite NaX and the 2,6-di(tert-butyl)4-methyl phenol used in the mixture were in the form of a light tan powder that had been produced as described in Example III. The 2,6-di(tert-butyl)4-methyl phenol was retained by the Zeolite NaX. The gum compound so formed was cured by heating at 174° C. for 20 minutes in a conventional slab mold to produce an elastomer. One part of the elastomer was heat aged by heating at 250° C. for 24 hours. A second part of the elastomer was heat aged by heating at 315° C. for 24 hours and was found to be too hard and brittle to be tested; but was smooth and tough and had considerable strength. (See Table I, references M, N and O.)

Employing the same procedure, another elastomer was prepared from a curable gum compound that was the same as the above gum compound except that it contained no 2,6-di(tert-butyl)4-methyl phenol. (See Table I, references P and Q.)

EXAMPLE VII

A curable gum compound was formed on a two-roll, 6-in. rubber mill. The gum compound contained the following components: 100 parts by weight of a dimethylpolysiloxane gum, 40 parts by weight of finely divided silica ("Santocel CS"), 0.8 part by weight of di(tert-butyl) peroxide, 2.1 parts by weight of Zeolite NaX and 0.25 part by weight of 2,6-di(tert-butyl)4-methyl phenol. The gum and the finely divided silica had been pre-blended and aged for 6 months. The Zeolite NaX and the 2,6-di-(tert-butyl)4-methyl phenol used in the mixture were in the form of a light tan powder that had been produced as described in Example III. The 2,6-di(tert-butyl)4-methyl phenol was retained by the Zeolite NaX. The gum compound so formed was cured by heating at 174° C. for 20 minutes in a conventional slab mold to produce an elastomer.

One part of the elastomer so produced was heat aged by heating at 250° C. for 24 hours and the physical properties of the heat aged product were tested. Another part of the elastomer was heat aged by heating at 315° C. for 24 hours to produce a heat aged product that was too hard and brittle to test but that was smooth and tough and had considerable strength. (See Table I, references R, S and T.)

The elastomers prepared as described in Examples IV through VII were tested. The results of the test are tabulated on Table I which indicated the thermal stability of the stabilized silicone elastomers of this invention.

Table I

| Ref. | Antioxidant [a] | Peroxide | Heating Temp. (°C.) | Heating Time (hrs.) | Tensile | Elongation (percent) | Set at Break (percent) | Hardness (Shore A) |
|---|---|---|---|---|---|---|---|---|
| A | PBNA [d]—0.25 | DTBP [c] | 174 | [g] ⅓ | 850 | 250 | 0 | 44 |
| B | PBNA—0.25 | DTBP | 315 | *24 | 541 | 190 | 0 | 49 |
| C | PBNA—0.25 | DTBP | 315 | *96 | ([h]) | ([h]) | ([h]) | ([h]) |
| D | PBNA—2.0 | DTBP | 174 | [g] ⅓ | 510 | 550 | 10 | 28 |
| E | PBNA—2.0 | DTBP | 315 | *24 | 232 | 250 | 0 | 34 |
| F | PBNA—2.0 | DTBP | 315 | *96 | 358 | 100 | 0 | 62 |
| G | DNPD [e]—0.25 | DTBP | 174 | [g] ⅓ | 800 | 250 | 0 | 41 |
| H | DNPD—0.25 | DTBP | 315 | *24 | 587 | 210 | 0 | 45 |
| I | DNPD—0.25 | DTBP | 315 | *96 | ([h]) | ([h]) | ([h]) | ([h]) |
| J | DNPD—2.0 | DTBP | 174 | [g] ⅓ | 779 | 450 | 2 | 36 |
| K | DNPD—2.0 | DTBP | 315 | *24 | 378 | 225 | 0 | 42 |
| L | DNPD—2.0 | DTBP | 315 | *96 | 457 | 100 | 0 | 72 |
| M | DTBMP [f]—0.25 | BP | 174 | [g] ⅓ | 946 | 278 | 0 | 43 |
| N | DTBMP—0.25 | BP | 250 | *24 | 895 | 260 | 0 | 43 |
| O | DTBMP—0.25 | BP | 315 | *24 | ([i]) | ([i]) | ([i]) | ([i]) |
| P | None | BP [b] | 250 | *24 | 883 | 310 | 2 | 44 |
| Q | None | BP | 315 | *24 | ([j]) | ([j]) | ([j]) | ([j]) |
| R | DTBMP—0.25 | DTBP | 174 | [g] ⅓ | 960 | 250 | 0 | 45 |
| S | DTBMP—0.25 | DTBP | 250 | *24 | 949 | 230 | 0 | 46 |
| T | DTBMP—0.25 | DTBP | 315 | *24 | ([i]) | ([i]) | ([i]) | ([i]) |

*Heat age.
[a] The amount of antioxidant is given as parts by weight per 100 parts by weight of the gum; all antioxidants were retained by Zeolite NaX.
[b] BP is benzoyl peroxide.
[c] DTBP is di(tert-butyl) peroxide.
[d] PBNA is N-phenyl-beta-naphthylamine.
[e] DNPD is N,N'-bis-dinaphthyl-para-phenylene diamine.
[f] DTBMP is 2,6-di(tert-butyl)4-methyl phenol.
[g] Mold cure.
[h] Too brittle to test.
[i] Too brittle to test but not flaky; better than Reference Q.
[j] Too brittle and flaky to test.

EXAMPLE VIII (A) A curable gum compound was formed on a two-roll, 6-in. rubber mill. The gum compound contained the following components: 100 parts by weight (100 g.) of dimethylpolysiloxane gum, 40 parts by weight (40 g.) of finely divided silica ("Santocel CS"), 0.8 parts by weight (0.48 g.) of a mixture (containing 50 parts by weight of benzoyl peroxide and 50 parts by weight of a dimethylpolysiloxane oil per 100 parts by weight of the mixture), 1.49 parts by weight (1.49 g.) of Zeolite NaX and 0.26 part by weight (0.26 g.) of phenyl-beta-naphthylamine. The gum and the finely divided silica had been pre-blended and aged for 4 months. The Zeolite NaX and the phenyl-beta-naphthylamine used in the mixture were in the form of a brown powder that had been produced as described in Example I. The phenyl-beta-naphthylamine was retained by the Zeolite NaX. The gum compound was cured by heating the mixture at 125° C. for 16 minutes to produce an elastomer (see Table II, reference U).

Employing the same procedure, an attempt was made to cure a mixture that was similar with the above gum compound except for the absence of a zeolite. This mixture could not be cured to form an elastomer (see Table II, reference V).

(B) A curable gum compound was formed on a two-roll, 7-in. rubber mill. The gum compound contained the following components: 100 parts by weight (200 g.) of dimethylpolysiloxane gum, 40 parts by weight (80 g.) of finely divided silica ("Santocel CS"), 0.8 part by weight (0.96 g.) of di(tert-butyl) peroxide, 4.1 parts by weight (4.1 g.) of Zeolite NaX and 0.5 part by weight (0.5 g.) of 2,6-di(tert-butyl)4-methyl phenol. The gum and the finely divided silica had been pre-blended and aged for 6 months. The Zeolite NaX and the 2,6-di(tert-butyl)4-methyl phenol used in the mixture were in the form of a light tan powder that had been produced as described in Example III. The 2,6-di(tert-butyl)4-methyl phenol was retained by the Zeolite NaX. The mixture so formed was cured by heating the mixture at 174° C. for 20 minutes to produce an elastomer (see Table II, reference W).

Employing the same procedure, an attempt was made to cure a mixture that was identical with the above curable gum compound except for the absence of a zeolite. This mixture could not be cured to form an elastomer (see Table IV, reference X).

Table II indicates that antioxidant retained on zeolitic molecular sieves do not react with peroxides thereby preventing the curing process.

Table II

| Ref. | Antioxidant Type | Antioxidant Amount [a] | Peroxide | Tensile (p.s.i.) | Elongation (percent) | Set at break (percent) | Hardness (Shore A) |
|---|---|---|---|---|---|---|---|
| U | PBNA [e] | 0.5 | BP [b] | 757 | 185 | 0 | 52 |
| V | PBNA [d] | 0.5 | BP | ([h]) | ([h]) | ([h]) | ([h]) |
| W | DTBMP [g] | 0.5 | DTBP [c] | 960 | 250 | 0 | 46 |
| X | DTBMP [f] | 0.5 | DTBP | ([h]) | ([h]) | ([h]) | ([h]) |

[a] The amount of antioxidant is given as parts by weight per 100 parts by weight of the gum.
[b] BP is benzoyl peroxide.
[c] DTBP is di(tert-butyl) peroxide.
[d] PBNA is phenyl-beta-naphthylamine that is not retained by a zeolitic molecular sieve.
[e] PBNA is phenyl-beta-naphthylamine that is retained by Zeolite NaX.
[f] DTBMP is 2,6-di(tert-butyl)4-methyl phenol that is not retained by a zeolitic molecular sieve.
[g] DTBMP is 2,6-di(tert-butyl)4-methyl phenol that is retained by Zeolite NaX.
[h] No cure obtained.

What is claimed is:

1. A process for producing stabilized silicone elastomers which comprises forming a mixture containing: (1) an organo-polysiloxane gum containing from 0.05 parts to 3.0 parts by weight of siloxane groups represented by the formula:

wherein R is a monovalent hydrocarbon group that is free of olefinic and acetylenic unsaturation and R' is a monovalent olefinically unsaturated hydrocarbon group and containing from 97.0 parts to 99.95 parts by weight of siloxane groups represented by the above formula, wherein R and R' are monovalent hydrocarbon groups that are free of olefinic and acetylenic unsaturation; (2) a curing agent selected from the group consisting of the alkyl peroxides and the acyl peroxides; (3) a zeolitic molecular sieve, said zeolitic molecular sieve being a crystalline metal-alumino-silicate and said zeolitic molecular sieve retaining an aromatic antioxidant containing an aryl group having a substituent selected from the group consisting of the amino, hydroxyl and alkoxy groups and (4) a filler to form a curable gum compound and heating the curable gum compound to a temperature from 110° C. to 200° C. to cure the gum compound to produce an elastomer.

2. The process of claim 1 wherein the monovalent olefinically unsaturated hydrocarbon group represented by R' is a vinyl group and the curing agent is di(tert-butyl) peroxide.

3. The process of claim 1 wherein the zeolitic molecular sieve is represented by the average formula:

$$1.0\pm0.1M'_{\frac{2}{m}}O:Al_2O_3:6.4\pm0.5SiO_2:Y'H_2O$$

wherein M is a cation selected from the group consisting of the cations of the monovalent, divalent and trivalent metal ions of groups I, II and III of the periodic table; $m$ is the valence of the cation represented by M' and Y' has a value from 0 to about 7.

4. The process of claim 1 wherein the zeolitic molecular sieve is represented by the average formula:

$$0.9\pm0.2M^2_{\frac{2}{m}}O:Al_2O_3:2.5\pm0.5SiO_2:Y^2H_2O$$

wherein $M^2$ is a cation having a valence of not more than three, $m$ is the valence of the cation represented by $M^2$ and $Y^2$ has a value from 0 to about 8.

5. The process of claim 1 wherein the zeolitic molecular sieve is represented by the average formula:

$$0.9\pm0.2Na_2O:Al_2O_3:GSiO_2:Y^3H_2O$$

wherein G has a value from greater than 3 and up to about 5 and $Y^3$ has a value from 0 to about 9.

6. The process of claim 1 wherein the zeolitic molecular sieve is represented by the average formula:

$$1\pm0.1M^3_{\frac{2}{p}}O:1Al_2O_3:4.75\pm0.25SiO_2:Y^4H_2O$$

wherein $M^3$ is a cation selected from the group consisting of calcium and sodium, $p$ is the valence of the cation represented by $M^3$ and $Y^4$ has a value from 0 to about 8.

7. A process for producing stabilized silicone elastomers which comprises forming a mixture containing: (1) an organo-polysiloxane gum composed of siloxane groups represented by the formula:

wherein R and R' are monovalent hydrocarbon groups that are free of olefinic and acetylenic unsaturation; (2) an acyl peroxide curing agent; (3) a zeolitic molecular sieve, said zeolitic molecular sieve being a crystalline metal-alumino-silicate and said zeolitic molecular sieve retaining an aromatic antioxidant containing an aryl group having a substituent selected from the group consisting of the amino, hydroxyl and alkoxy groups; and (4) a filler to form a curable gum compound and heating the curable gum compound to a temperature from 110° C. to 200° C. to cure the gum compound to produce an elastomer.

8. The process of claim 7 wherein the zeolitic molecular sieve is represented by the average formula:

$$1.0\pm0.1M^3_{\frac{2}{m}}O:Al_2O_3:6.4\pm0.5SiO_2:Y'H_2O$$

wherein M' is a cation selected from the group consisting of the cations of the monovalent, divalent and trivalent metal ions of groups I, II and III of the periodic table; $m$ is the valence of the cation represented by M' and Y' has a value from 0 to about 7.

9. The process of claim 7 wherein the zeolitic molecular sieve is represented by the average formula:

$$0.9\pm0.2M^2_{\frac{2}{m}}O:Al_2O_3:2.5\pm0.5SiO_2:Y^2H_2O$$

wherein $M^2$ is a cation having a valence of not more than three, $m$ is the valence of the cation represented by $M^2$ and $Y^2$ has a value from 0 to about 8.

10. The process of claim 7 wherein the zeolitic molecular sieve is represented by the average formula:

$$0.9\pm0.2Na_2O:Al_2O_3:GSiO_2:Y^3H_2O$$

wherein G has a value from greater than 3 and up to about 5 and $Y^3$ has a value from 0 to about 9.

11. The process of claim 7 wherein the zeolitic molecular sieve is represented by the average formula:

$$1\pm0.1M^3_{\frac{2}{p}}O:Al_2O_3:4.75\pm0.25SiO_2:Y^4H_2O$$

wherein $M^3$ is a cation selected from the group consisting of calcium and sodium, $p$ is the valence of the cation represented by $M^3$ and $Y^4$ has a value from 0 to about 8.

12. A process for producing a stabilized silicone elastomer which comprises forming a mixture containing (1) an organopolysiloxane gum composed from 0.2 part to 0.4 part by weight of ethylvinylsiloxy groups and from 99.6 parts to 99.8 parts by weight of dimethylsiloxy groups; (2) di(tert-butyl) peroxide as a curing agent; (3) N-phenyl-beta-naphthylamine retained by a zeolitic molecular sieve having the formula:

$$0.9\pm0.2Na_2O:Al_2O_3:2.5\pm0.5SiO_2:Y^2H_2O$$

wherein $Y^2$ has a value from 0 to about 8; and (4) finely divided silica to form a curable gum compound and heating the curable gum compound to a temperature from 170° C. to 180° C. to cure the gum compound to produce an elastomer.

13. A process for producing a stabilized silicone elastomer which comprises forming a mixture containing (1) an organopolysiloxane gum composed of from 0.2 part to 0.4 part by weight of ethylvinylsiloxy groups and from 99.6 parts to 99.8 parts by weight of dimethylsiloxy groups; (2) di(tert-butyl) peroxide as a curing agent; (3) N,N'-bis-dinaphthyl-para-phenylene diamine retained by a zeolitic molecular sieve having the formula:

$$0.9\pm0.2Na_2O:Al_2O_3:2.5\pm0.5SiO_2:Y^2H_2O$$

wherein $Y^2$ has a value from 0 to about 8; and (4) finely divided silica to form a curable gum compound and heating the curable gum compound to a temperature from 170° C. to 180° C. to cure the gum compound to produce an elastomer.

14. A process for producing a stabilized silicone elastomer which comprises forming a mixture containing (1) an organopolysiloxane gum composed of from 0.2 part to 0.4 part by weight of ethylvinylsiloxy groups and from 99.6 parts to 99.8 parts by weight of dimethylsiloxy groups; (2) di(tert-butyl) peroxide as a curing agent: (3) 2,6-di(tert-butyl)-4-methyl phenol retained by a zeolitic molecular sieve having the formula:

$$0.9\pm0.2Na_2O:Al_2O_3:2.5\pm0.5SiO_2:Y^2H_2O$$

wherein $Y^2$ has a value from 0 to about 8; and (4) finely divided silica to form a curable gum compound and heating the curable gum compound to a temperature from 170° C. to 180° C. to cure the gum compound to produce an elastomer.

15. A process for producing a stabilized silicone elastomer which comprises forming a mixture containing (1) an organopolysiloxane gum composed of from 0.2 part to 0.4 part by weight of ethylvinylsiloxy groups and from 99.6 parts to 99.8 parts by weight of dimethylsiloxy groups; (2) benzoyl peroxide as a curing agent; (3) N,N'-bis-dinaphthyl-para-phenylene diamine retained by a zeolitic molecular sieve having the formula:

$$0.9\pm0.2Na_2O:Al_2O_3:2.5\pm0.5SiO_2:Y^2H_2O$$

wherein $Y^2$ has a value from 0 to about 8; and (4) finely divided silica to form a curable gum compound and heating the curable gum compound to a temperature from 170° C. to 180° C. to cure the gum compound to produce an elastomer.

16. A curable gum compound comprising an organopolysiloxane gum composed of groups having the formula:

$$-\underset{\underset{R'}{|}}{\overset{\overset{R}{|}}{Si}}O-$$

wherein R represents a monovalent hydrocarbon group that is free of olefinic and acetylenic unsaturation and R' represents a member selected from the group consisting of the monovalent hydrocarbon groups that are free of olefinic and acetylenic unsaturation and the monovalent olefinically unsaturated groups and a zeolitic molecular sieve, said zeolitic molecular sieve being a crystalline metal-alumino-silicate and said zeolitic molecular retaining an aromatic antioxidant containing an aryl group having a substituent selected from the group consisting of the amino, hydroxyl and alkoxy groups.

17. A curable gum compound comprising (1) an organopolysiloxane gum containing from 0.05 part to 3.0 parts by weight of siloxane groups represented by the formula:

$$-\underset{\underset{R'}{|}}{\overset{\overset{R}{|}}{Si}}O-$$

wherein R is a monovalent hydrocarbon group that is free of olefinic and acetylenic unsaturation and R' is a monovalent olefinically unsaturated hydrocarbon group and containing from 97.0 parts to 99.95 parts by weight of siloxane groups represented by the above formula, wherein R and R' are monovalent hydrocarbon groups that are free of olefinic and acetylenic unsaturation; (2) a curing agent selected from the group consisting of the alkyl peroxides and the acyl peroxides; (3) a zeolitic molecular sieve selected from the group consisting of zeolites having the average formulae:

(a) $$1.0\pm0.1M'_{\frac{2}{m}}O:Al_2O_3:6.4\pm0.5SiO_2:Y'H_2O$$

wherein M is a cation selected from the group consisting of the cations of the monovalent, divalent and trivalent metal ions of groups I, II and III of the periodic table; m is the valance of the cation represented by M' and Y' has a value from 0 to about 7

(b) $$0.9\pm0.2M^2_{\frac{2}{m}}O:Al_2O_3:2.5\pm0.5SiO_2:Y^2H_2O$$

wherein $M^2$ is a cation having a valence of not more than three, m is the valence of the cation represented by $M^2$ and $Y^2$ has a value from 0 to about 8

(c) $$0.9\pm0.2Na_2O:Al_2O_3:GSiO_2:Y^3H_2O$$

wherein G has a value from greater than 3 and up to about 5 and $Y^3$ has a value from 0 to about 9 and (d) $$1\pm0.1M^3_{\frac{2}{p}}O:1Al_2O_3:4.75\pm0.25SiO_2:Y^4H_2O$$

wherein $M^3$ is a cation selected from the group consisting of calcium and sodium, p is the valence of the cation represented by $M^3$ and $Y^4$ has a value from 0 to about 8, said zeolitic molecular sieve retaining an aromatic antioxidant containing an aryl group having a substituent selected from the group consisting of the amino, hydroxyl and alkoxy groups and (4) a filler.

18. A curable gum compound comprising (1) an organopolysiloxane gum composed of siloxane groups represented by the formula:

$$-\underset{\underset{R'}{|}}{\overset{\overset{R}{|}}{Si}}O-$$

wherein R and R' are monovalent hydrocarbon groups that are free of olefinic and acetylenic unsaturation; (2) an acyl peroxide curing agent; (3) a zeolitic molecular sieve, selected from the group consisting of zeolites having the average formulae:

(a) $$1.0\pm0.1M'_{\frac{2}{m}}O:Al_2O_3:6.4\pm0.5SiO_2:Y'H_2O$$

wherein M is a cation selected from the group consisting of the cations of the monovalent, divalent and trivalent metal ions of groups I, II and III of the periodic table; m is the valence of the cation represented by M' and Y' has a value from 0 to about 7

(b) $$0.9\pm0.2M^2_{\frac{2}{m}}O:Al_2O_3:2.5\pm0.5SiO_2:Y^2H_2O$$

wherein $M^2$ is a cation having a valence of not more than three, m is the valence of the cation represented by $M^2$ and $Y^2$ has a value from 0 to about 8

(c) $$0.9\pm0.2Na_2O:Al_2O_3:GSiO_2:Y^3H_2O$$

wherein G has a value from greater than 3 and up to about 5 and $Y^3$ has a value from 0 to about 9; and (d) $$1\pm0.1M^3_{\frac{2}{p}}O:1Al_2O_3:4.75\pm0.25SiO_2:Y^4H_2O$$

wherein $M^3$ is a cation selected from the group consisting of calcium and sodium, p is the valence of the cation represented by $M^3$ and $Y^4$ has a value from 0 to about 8, said zeolitic molecular sieve retaining an aromatic antioxidant containing an aryl group having a substituent selected from the group consisting of the amino, hydroxyl and alkoxy groups and (4) a filler.

19. A stabilized silicone elastomer being composed of (1) a cured organopolysiloxane gum composed of siloxane groups having the formula:

$$-\underset{\underset{R'}{|}}{\overset{\overset{R}{|}}{Si}}O-$$

wherein R represents a monovalent hydrocarbon group that is free of olefinic and acetylenic unsaturation, and R' represents a member selected from the group consisting of monovalent hydrocarbon groups that are free of olefinic and acetylenic unsaturation and the monovalent olefinically unsaturated groups, and (2) a zeolitic molecular sieve, said zeolitic molecular sieve being a crystalline metal alumino-silicate and said zeolitic molecular sieve retaining an aromatic antioxidant containing an aryl group having a substituent selected from the group consisting of the amino, hydroxyl and alkoxy groups.

20. A stabilized silicon elastomer being composed of (1) a cured organopolysiloxane gum composed of siloxane groups having the formula:

wherein R represents a monovalent hydrocarbon group that is free of olefinic and acetylenic unsaturation, and R' represents a member selected from the group consisting of monovalent hydrocarbon groups that are free of olefinic and acetylenic unsaturation and the monovalent olefinically unsaturated groups, and (2) a zeolitic molecular sieve selected from the group consisting of zeolites having the average formulae:

(a)     $1.0 \pm 0.1 M'_{\frac{2}{m}} O : Al_2O_3 : 6.4 \pm 0.5 SiO_2 : Y' H_2O$ wherein M is a cation selected from the group consisting of the cations of the monovalent, divalent and trivalent metal ions of groups I, II and III of the periodic table, $m$ is the valence of the cation represented by M' and Y' has a value from 0 to about 7, (b)     $0.9 \pm 0.2 M^2_{\frac{2}{m}} O : Al_2O_3 : 2.5 \pm 0.5 SiO_2 : Y^2 H_2O$ wherein $M^2$ is a cation having a valence of not more than three, $m$ is the valence of the cation represented by $M^2$ and $Y^2$ has a value from 0 to about 8, (c)     $0.9 \pm 0.2\ Na_2O : Al_2O_3 : G\ SiO_2 : Y^3 H_2O$ wherein G has a value from greater than 3 and up to about 5 and $Y^3$ has a value from 0 to about 9 and d)     $1 \pm 0.1 M^3_{\frac{2}{p}} O : 1 Al_2O_3 : 4.75 \pm 0.25 SiO_2 : Y^4 H_2O$ wherein $M^3$ is a cation selected from the group consisting of calcium and sodium, $p$ is the valence of the cation represented by $M^3$ and $Y^4$ has a value from 0 to about 8, said zeolitic molecular sieve retaining an aromatic antioxidant containing an aryl group having a substituent selected from the group consisting of the amino, hydroxyl and alkoxy groups.

21. A process for producing stabilized silicone elastomers which comprises mixing an organopolysiloxane gum composed of groups having the formula:

wherein R represents a monovalent hydrocarbon group that is free of olefinic and acetylenic unsaturation and R' represents a member selected from the group consisting of the monovalent hydrocarbon groups that are free of olefinic and acetylenic unsaturation and the monovalent olefinically unsaturated groups and a zeolitic molecular sieve, said zeolitic molecular sieve being a crystalline metal-aluminosilicate and said zeolitic molecular sieve retaining an aromatic antioxidant containing an aryl group having a substituent selected from the group consisting of the amino, hydroxyl and alkoxy groups to form a curable gum compound and curing the curable gum compound.

22. A process for producing stabilized silicone elastomers which comprises mixing an organopolysiloxane gum composed of groups having the formula:

wherein R represents a monovalent hydrocarbon group that is free of olefinic and acetylenic unsaturation and R' represents a member selected from the group consisting of the monovalent hydrocarbon groups that are free of olefinic and acetylenic unsaturation and the monovalent olefinically unsaturated groups, an organic peroxide curing agent selected from the group consisting of the alkyl peroxides and the acyl peroxides and a zeolitic molecular sieve retaining an aromatic antioxidant containing an aryl group having a substituent selected from the group consisting of the amino, hydroxyl and alkoxy groups to form a curable gum compound and heating the curable gum compound to a temperature sufficiently elevated to cure the gum compound to produce an elastomer.

23. A process for producing stabilized silicone elastomers which comprises mixing an organopolysiloxane gum composed of groups having the formula:

wherein R represents a monovalent hydrocarbon group that is free of olefinic and acetylenic unsaturation and R' represents a member selected from the group consisting of the monovalent hydrocarbon groups that are free of olefinic and acetylenic unsaturation and the monovalent olefinically unsaturated groups, an organic peroxide curing agent selected from the group consisting of the alkyl peroxides and the acyl peroxides, a filler and a zeolitic molecular sieve retaining an aromatic antioxidant containing an aryl group having a substituent selected from the group consisting of the amino, hydroxyl and alkoxy groups to form a curable gum compound and heating the curable gum compound to a temperature from 110° C. to 200° C. to cure the gum compound to produce an elastomer.

References Cited in the file of this patent

UNITED STATES PATENTS

| | | |
|---|---|---|
| 2,389,802 | McGregor et al. | Nov. 27, 1945 |
| 2,460,795 | Warrick | Feb. 1, 1949 |
| 2,480,620 | Warrick | Aug. 30, 1949 |
| 2,517,536 | Chenicek | Aug. 8, 1950 |
| 2,557,928 | Atkinson | June 26, 1951 |
| 2,620,317 | Johannson | Dec. 2, 1952 |
| 2,666,041 | Pfeifer | Jan. 12, 1954 |
| 2,953,543 | Pike | Sept. 20, 1960 |

FOREIGN PATENTS

| | | |
|---|---|---|
| 563,518 | Belgium | Jan. 15, 1958 |